US008288998B2

(12) United States Patent
Masuda

(10) Patent No.: US 8,288,998 B2
(45) Date of Patent: Oct. 16, 2012

(54) METHOD AND APPARATUS FOR CHARGE DISCHARGE POWER CONTROL

(75) Inventor: Eiji Masuda, Toyota (JP)

(73) Assignee: Denso Corporation, Kariya (JP)

( * ) Notice: Subject to any disclaimer, the term of this patent is extended or adjusted under 35 U.S.C. 154(b) by 493 days.

(21) Appl. No.: 12/569,204

(22) Filed: Sep. 29, 2009

(65) Prior Publication Data

US 2010/0079111 A1    Apr. 1, 2010

(30) Foreign Application Priority Data

Sep. 30, 2008  (JP) ................................ 2008-252208

(51) Int. Cl.
*H02J 7/00*    (2006.01)
*G01N 27/416*  (2006.01)
*G08B 21/00*   (2006.01)
*B60K 1/00*    (2006.01)

(52) U.S. Cl. ........ 320/134; 320/149; 320/155; 324/426; 340/636.1; 340/636.21; 180/65.1

(58) Field of Classification Search ............. 320/134
See application file for complete search history.

(56) References Cited

U.S. PATENT DOCUMENTS 7,514,905 B2    4/2009 Kawahara et al.
7,583,053 B2 *  9/2009 Kamohara ................. 320/106
2002/0003417 A1* 1/2002 Bito et al. ................. 320/152
2004/0079564 A1* 4/2004 Tabata ...................... 180/65.2
2007/0013347 A1* 1/2007 Kamohara ................. 320/160
2007/0145953 A1* 6/2007 Asai et al. .................. 320/149
2009/0174369 A1   7/2009 Kawahara et al.

FOREIGN PATENT DOCUMENTS

| EP | 2 019 468 | 1/1999 |
|----|-----------|--------|
| JP | 8-140285 | 5/1996 |
| JP | 2002-058113 | 2/2002 |
| JP | 2005-020955 | 1/2005 |
| JP | 2005-039989 | 2/2005 |
| JP | 2007-012568 | 1/2007 |
| JP | 2007-028702 | 2/2007 |
| JP | 2008-024124 | 2/2008 |

OTHER PUBLICATIONS

Japanese Office Action dated Nov. 26, 2010, issued in corresponding Japanese Application No. 2008-252208 with English Translation.
Japanese Office Action dated Sep. 9, 2011, issued in corresponding Japanese Application No. 2008-252208 with English Translation.

* cited by examiner

*Primary Examiner* — Yalkew Fantu
(74) *Attorney, Agent, or Firm* — Nixon & Vanderhye P.C.

(57) ABSTRACT

Limit values of battery charging and discharging power are set by a battery charge discharge control apparatus, based on the estimation of the internal resistance of a battery according to a detected battery temperature and the sampling of a battery current and a battery voltage respectively detected by a current sensor and a voltage sensor. The limit values are used to control the battery current and the battery voltage to be within a current use range and a voltage use range of the battery, according to conditions of the battery in a vehicle.

14 Claims, 12 Drawing Sheets

Map51

Map52

Map53

Map54

METHOD AND APPARATUS FOR CHARGE DISCHARGE POWER CONTROL

CROSS REFERENCE TO RELATED APPLICATION

The present application is based on and claims the benefit of priority of Japanese Patent Application No. 2008-252208, filed on Sep. 30, 2008, the disclosure of which is incorporated herein by reference.

FIELD OF THE INVENTION

The present invention generally relates to a charge discharge control apparatus for controlling charging and discharging of a battery (i.e., a secondary battery) for use in a vehicle.

BACKGROUND INFORMATION

In recent years, a battery charge discharge control apparatus controls, as disclosed in Japanese patent document Laid-Open No. 2007-306771 (on pages 1 to 5; also available as EP2019468A1), a battery charge and discharge power for limiting a battery voltage applied to a battery within a normal voltage use range (i.e., within an allowable voltage range).

However, the battery (i.e., a secondary battery) may suffer an unintended internal composition change due to an abnormal chemical reaction when receiving an excessive charge energy that exceeds a maximum value of the SOC (State Of Charge: the remaining capacity of battery), even if the voltage between two terminals is within the normal voltage use range. The battery may also suffer the unintended internal composition change when the SOC is excessively decreased. Therefore, the charge energy should be kept in a certain range, that is, within a maximum and minimum allowable value range. The charge energy is determined based on the charge discharge current of the battery, and the use range of the charge discharge current is restricted according to the condition of the battery such as the SOC, temperature, cooling capacity and the like. Further, the battery has an internal resistance that generates heat according to the charge discharge current. Therefore, if a battery temperature increases excessively, the battery itself and/or its peripheral devices may suffer from breakage, deteriorated functionality or deformation due to the heat surpassing the heat-resistance capacity limit of the battery and the peripheral devices. In other words, a battery current should be kept within a normal current use range (i.e., within an allowable battery current range).

However, this normal current use range of the battery current may change according to the battery condition such as the SOC, battery temperature, the cooling capacity or the like, thereby inducing the battery current to surpass the allowable current range and causing the excessive heating that leads to the breakage and the like, even when the battery charge discharge power is restricted for limiting the battery voltage to be within the normal voltage use range (See FIG. 2).

SUMMARY OF THE INVENTION

In view of the above and other problems, the present disclosure provides a charge discharge control apparatus that controls a charge discharge power (i.e., electric power for charging and discharging a battery) of a battery for limiting both of a battery current and a battery voltage within respective use ranges (i.e., allowable current and voltage ranges), according to the conditions of the battery.

In an aspect of the present disclosure, the battery charge discharge control apparatus for controlling a battery charge discharge power of a battery in a vehicle includes: a current detector for detecting a battery current; a voltage detector for detecting a battery voltage; an internal resistance estimation unit for estimating an internal resistance of the battery; and a charge discharge power control unit for setting a limit value of the battery charge discharge power, based on the detected battery current, the detected battery voltage and the estimated internal resistance, to limit the battery current and the battery voltage respectively within a current use range and a voltage use range.

According to the control apparatus in the present disclosure, the battery current/voltage/temperature are either detected or estimated for controlling the battery charge discharge power with the battery current and the battery voltage limited within the respective use ranges, thereby protecting the battery from the excessive heat caused by the excessive charge discharge current without compromising the maximum charge discharge capacity of the battery.

For further calculation efficiency, the internal resistance estimation unit described above may be omitted. That is, by calculating a current difference between the detected battery current and minimum/maximum values of a current use range and a voltage difference between the detected battery voltage and minimum/maximum values of a voltage use range, without estimating the internal resistance of the battery, the same advantageous effects of the control apparatus is achieved. That is, keeping the battery current/voltage to be within the current use range and the voltage use range while charging/discharging the battery can be achieved in a simpler manner. Therefore, the battery charged/discharged under control of the apparatus of the present disclosure is prevented from excessive heat that damages its functionality, without restricting full utilization of the battery capacity regarding the charging and discharging.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiments of the present disclosure are described as applications of the advantageous idea to a charge discharge control apparatous of a hybrid electric vehicle in the following passages.

First Embodiment

The first embodiment of the present disclosure is explained with reference to FIGS. 1 to 7.

Figure 1:
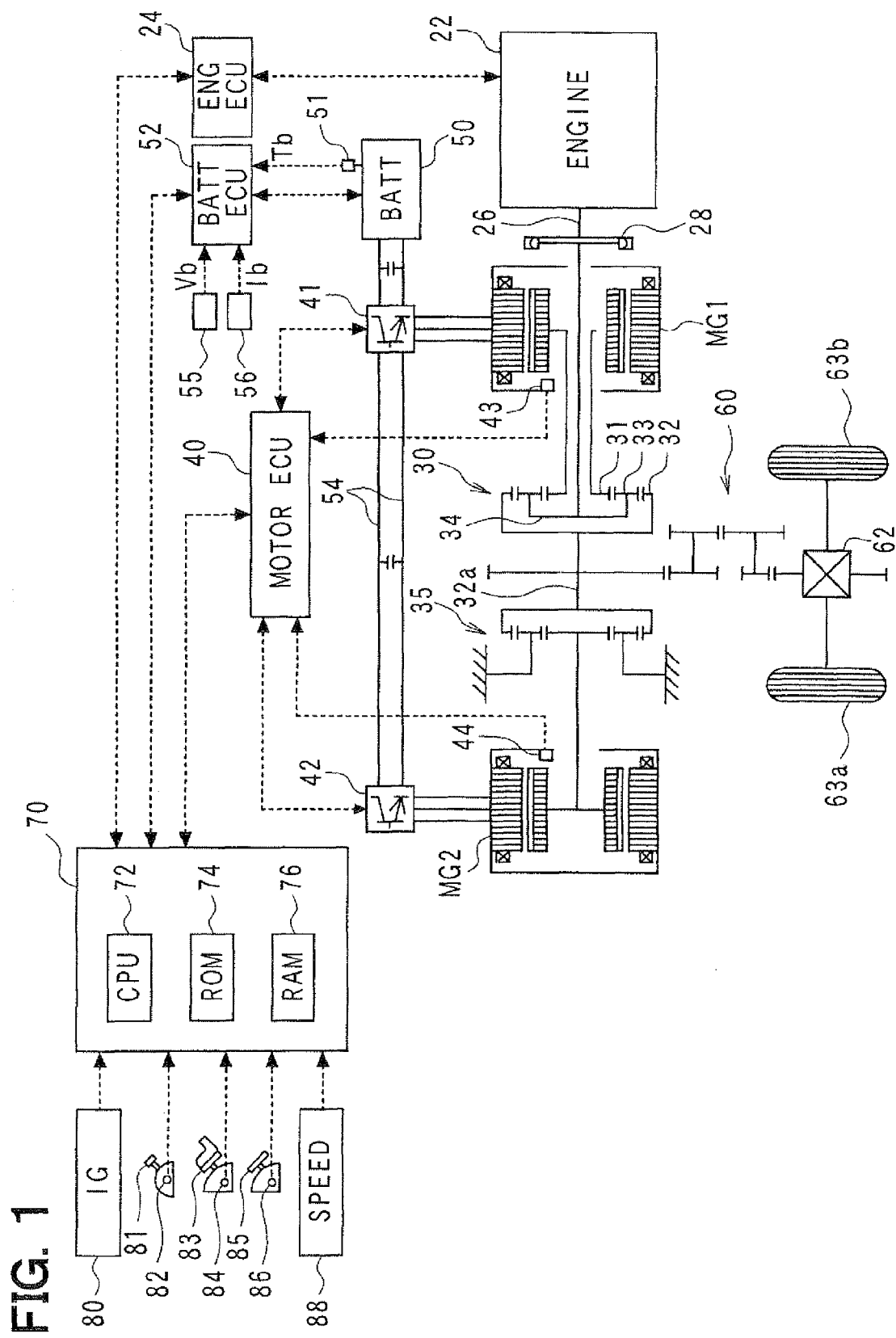
FIG. 1 is a block diagram of configuration of a hybrid electric vehicle in an embodiment of the present disclosure.

FIG. 1 is a block diagram of configuration of the hybrid electric vehicle. In the present embodiment, the hybrid electric vehicle includes an engine 22, a power division mechanism 30 having three axes in connection to a crank shaft 26 of the engine 22 through a dumper 28, a first motor MG 1 that serves as a generator if required in connection to the power division mechanism 30, a reduction gear 35 engaging with a ring gear axis 32a that is in connection to the power division mechanism 30, a second motor MG 2 that serves as a generator if required in connection to the reduction gear 35 and other parts. The above components are operated as a hybrid drive system under a total control of a hybrid ECU 70. The abbreviation "ECU" stands for an electronic control unit that employs, as a main part, a microcomputer for controlling the system circuitry.

The engine 22 is an internal combustion engine using, as its fuel, gasoline, gas oil, and an alcohol blended fuel. An engine ECU 24 controls the engine 22 in terms of fuel injection, ignition control, throttle control and the like by reading output signals from various sensors such as a crank angle sensor, a temperature sensor and the like, for detecting a driving condition of the engine 22. The engine ECU 24 is connected to the hybrid ECU 70 through a communication line, for receiving a control signal from the hybrid ECU 70 to control the engine 22, and for transmitting a driving condition signal regarding a driving condition of the engine 22 to the hybrid ECU 70 on demand.

The power division mechanism 30 has a sun gear 31, the ring gear 32 that is coaxially disposed with the sun gear 31, multiple pinion gears 33 that engage with both of the sun gear 31 and the ring gear 32, and a carrier 34 that holds the multiple pinion gears 33 for free rotation and free revolution. That is, the power division mechanism 30 is a "planetary gear mechanism" having the sun gear 31, the ring gear 32 and the multiple pinion gears 33 as its components.

As the carrier 34 is connected to the crank shaft 26 of the engine, and the sun gear 31 is connected to the first motor MG 1, and the ring gear 32 is connected to the reduction gear 35 through the ring gear axis 32a, engine power of the engine 22 input from the carrier 34 is distributed to both of the sun gear 31 and the ring gear 32 according the gear ratio when the first motor MG 1 functions as a generator. When the first motor MG 1 functions as a motor (a driving force of the vehicle), engine power of the engine 22 from the carrier 34 and motor power from the sun gear 31 are integrated and output to the ring gear 32. The power output to the ring gear 32 is finally transmitted to driving wheels 63a, 63b of the vehicle, through a gear mechanism 60 and a differential gear 62 via the ring gear axis 32a.

The first motor MG 1 and the second motor MG 2 are a synchronous generator-motor that serves as both of a generator and a motor. The MG 1 and MG 2 respectively exchange electric power with a battery 50 (i.e., a secondary battery) through inverters 41, 42. A power line 54 that connects the battery 50 and the inverters 41, 42 is commonly used by the inverters 41, 42 as bus conductors (i.e., a positive bus and a negative bus), in order to supply generated electric power from one of the two generator-motors to the other. Therefore, the battery 50 is charged and discharged, according to a magnitude relation between generated electricity and consumed electricity of the two generator-motors MG 1, MG 2.

The motor ECU 40 for controlling the generator-motors MG 1, MG 2 receives signal inputs and transmits control signals for controlling those motors MG 1, MG 2. That is, for example, output signals from encoders 43, 44 or the like for detecting rotor positions of those motors MG 1, MG 2 are provided for the motor ECU 40 together with the phase current that is applied to the motors MG 1, MG 2 and detected by current sensors (not shown in the drawing), and switching control signals are output from the ECU 40 to the inverters 41, 42. The motor ECU 40 is connected to the hybrid ECU 70 through a communication line for receiving and transmitting signals to and from the hybrid ECU 70, for controlling the motors MG 1, MG 2 and for reporting driving conditions of the motors MG 1, MG 2 on demand.

The charge and discharge of the battery 50 is controlled by a battery ECU 52. For example, required signals for controlling charge and discharge of the battery 52, such as a signal representing a charge discharge current Ib (i.e., designated as a battery current hereinafter) of the battery 50 detected by a current sensor 56 (i.e., a current detector in claims) on a power line 54 that is connected to output terminals of the battery 50 as well as a signal representing an inter-terminal voltage Vb (i.e., designated as a battery voltage hereinafter) of the battery 50 detected by a voltage sensor 55 (i.e., a voltage detector in claims) on the output terminals of the battery 50, in addition to a signal representing a battery temperature detected by a temperature sensor 51 on the battery 50, are input to the battery ECU 52, and signals representing battery conditions are transmitted to the hybrid ECU 70 on demand. Further, the battery ECU 52 calculates charge conditions (i.e., a remaining capacity, or a state of charge abbreviated as "SOC") of the battery 50 based on an integrated value of the battery current Ib detected by the current sensor 56 for the charge discharge control of the battery 50.

The hybrid ECU 70 uses, as a main part, a microcomputer having a CPU 72 together with a ROM 74 memorizing data and various programs, a RAM 76 storing data temporarily and the like. The hybrid ECU 70 receives input signals from various sensors, such as an ignition signal from an ignition (IG) switch 80, a shift position signal representing an operation position of a shift lever 81 from a shift position sensor 82, an accelerator opening signal representing an operation position of an acceleration pedal 83 from an accelerator sensor 84, a brake pedal position signal representing an operation position of a brake pedal 85 from a brake pedal position sensor 86, a vehicle speed signal from a vehicle speed sensor 88, and the like. The hybrid ECU 70 is connected, through a communication line, to the engine ECU 24, the motor ECU 40 and the battery ECU 52 as mentioned above, and exchanges various control signals and data signals with the engine ECU 24, the motor ECU 40 and the battery ECU 52.

The hybrid electric vehicle in the present embodiment having the above-described configuration is driven by the engine 22 and the two motors MG 1, MG 2 based on a calculation of a required torque output to the ring gear axis 32*a*, which serves as a drive shaft, according to the accelerator opening signal from the accelerator sensor 84, the vehicle speed signal from the vehicle speed sensor 88 and the like.

There are at least three driving control modes in terms of controlling the engine 22, and the motors MG 1, MG 2. That is, a torque conversion driving mode, a charge discharge driving mode, and a motor driving mode are provided, together with other modes.

In the torque conversion driving mode, the engine 22 is controlled so that a required power is output from the engine 22, and the two motors MG 1, MG 2 are controlled so that all of the output power from the engine 22 is output to the ring gear axis 32*a* after torque conversion by the power division mechanism 30 and the two motors MG 1, MG 2.

In the charge discharge driving mode, the engine 22 is controlled so that a sum of a required power and an electric power for charging/discharging the battery 50 is output from the engine 22, and the two motors MG 1, MG 2 are controlled so that the required power derived from all or a part of the output from the engine 22 together with the charging/discharging of the battery 50 is output to the ring gear axis 32*a* after torque conversion by the power division mechanism 30 and the two motors MG 1, MG 2.

In the motor driving mode, the engine 22 is stopped, and the two motors MG 1, MG 2 are controlled so that a required power is output from the second motor MG 2 to the ring gear axis 32*a*.

However, the battery 50 (i.e., a secondary battery) may suffer an unintended internal composition change due to an abnormal chemical reaction when receiving an excessive charge energy that exceeds a maximum value of the SOC (State Of Charge: the remaining capacity of the battery), even if the voltage between two battery terminals is within the normal voltage use range. The battery may also suffer the unintended internal composition change when the SOC is excessively decreased. Therefore, the charge discharge energy should be kept in a certain range, that is, within a maximum and minimum allowable value. The charge discharge energy is determined based on the charge discharge current of the battery 50, and the use range of the charge discharge current is restricted according to the condition of the battery 50 such as the SOC, temperature, cooling capacity and the like. Further, the battery has an internal resistance that generates heat according to the charge discharge current. Therefore, if a battery temperature Tb increases excessively, the battery 50 itself and/or its peripheral devices may suffer from breakage, deteriorated functionality or deformation due to the heat surpassing the heat-resistance capacity limit of the battery 50 and the peripheral devices. In other words, a battery current Ib should be kept within a normal current use range (i.e., within an allowable battery current range).

Figure 2:
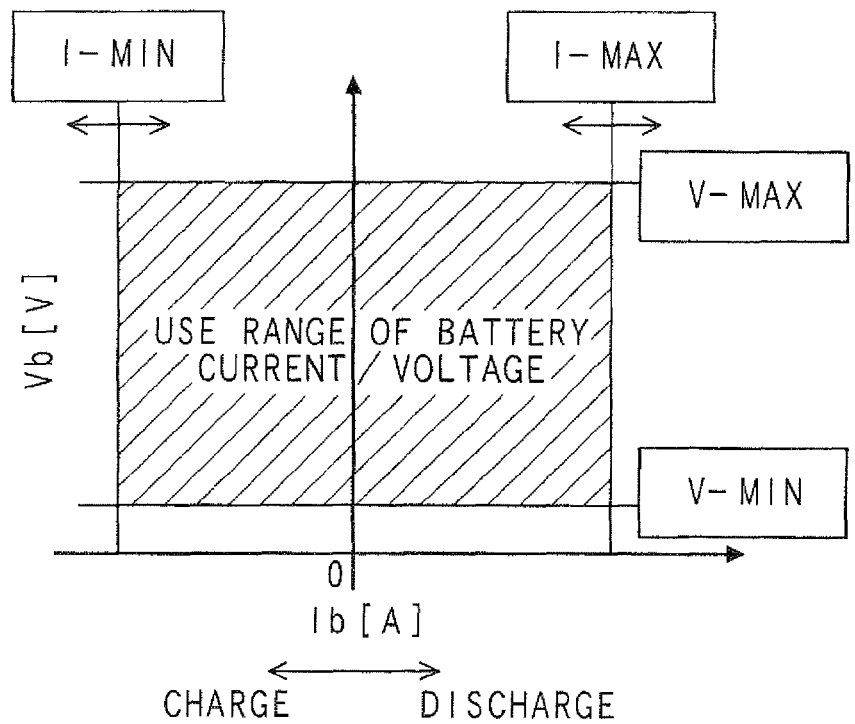
FIG. 2 is a diagram of a use range of electric current and voltage of a battery.

However, this normal current use range of the battery current Ib may change according to the battery condition such as the SOC, battery temperature, cooling capacity or the like, thereby inducing the battery current Ib to surpass the allowable current range and causing the excessive heating that leads to the breakage and the like, even when the battery charge discharge power is restricted for limiting the battery voltage Vb to be within the normal voltage use range (See FIG. 2, for the change of the current use range defined by I-MAX and I-MIN along the horizontal axis of the battery voltage-current diagram).

In the present embodiment, the excessive battery current is prevented by adopting the following operation scheme. That is, the internal resistance of the battery 50 is estimated based on the battery temperature Tb detected by the temperature sensor 51, and limit values of the charge discharge power of the battery 50 are set based on the detected battery current Ib from the current sensor 56 and the detected battery voltage Vb from the voltage sensor 55 as well as the estimated internal resistance of the battery 50, so that the battery current Ib and the battery voltage Vb are limited within a certain current use range and a certain voltage use range.

A method of setting the limit value of the charge discharge power is more concretely explained in the following.

The battery current Ib and the battery voltage Vb are sampled at scheduled intervals. Because sampled battery current Ib and battery voltage Vb are determined by battery characteristics including influences of a polarization condition, dispersion, and/or the aging deterioration of the battery 50, an ever-changing battery condition at the moment of sampling can be considered and taken into account in terms of the limit value of the charge discharge power that is determined based on the battery current Ib and the battery voltage Vb.

In addition, the battery current Ib and the battery voltage Vb is actually detected time after time at subsequent sampling timings, thereby making it possible to update the battery condition even if the battery condition has changed between the sampling timings. That is, in other words, a steep change of the battery condition can be accommodated if the sampling intervals are appropriately determined.

The battery voltage Vb and the battery current Ib are correlated to each other, and the correlation between the current and the voltage is changed depending on the factors such as the battery temperature Tb, the SOC (the remaining battery capacity) or the like.

The relation between the battery voltage Vb, the battery current Ib and a direct current component Rb of the internal resistance of the battery 50 is represented by an equation 1 in the following.

$$Vb = Eo - IbRb - \eta x \quad \text{(Equation 1)}$$

In the equation 1, Eo represents an open voltage, $\eta x$ represents voltage change due to the polarization effects.

In this case, if Ri is defined as $Ri = Rb + \eta x/Ib$, the above equation 1 is converted to a following equation 2.

$$Vb = Eo - IbRi \quad \text{(Equation 2)}$$

In the above equation, Ri represents an equivalent of the internal resistance including the influence of the polarization effects.

Figure 3:
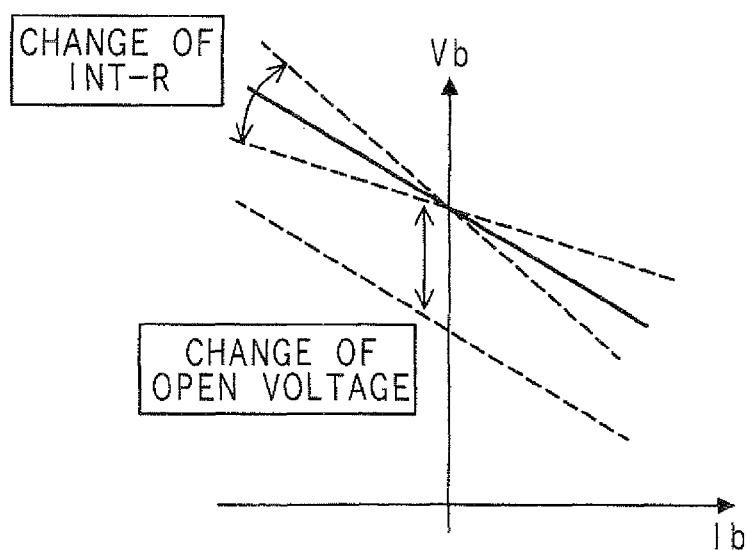
FIG. 3 is an illustration of change of an internal resistance and an open voltage of the battery.

The open voltage Eo and the internal resistance Ri continuously change depending on the battery conditions such as the battery temperature Tb, the remaining capacity SOC, the polarization state or the like (See FIG. 3).

Figure 4:
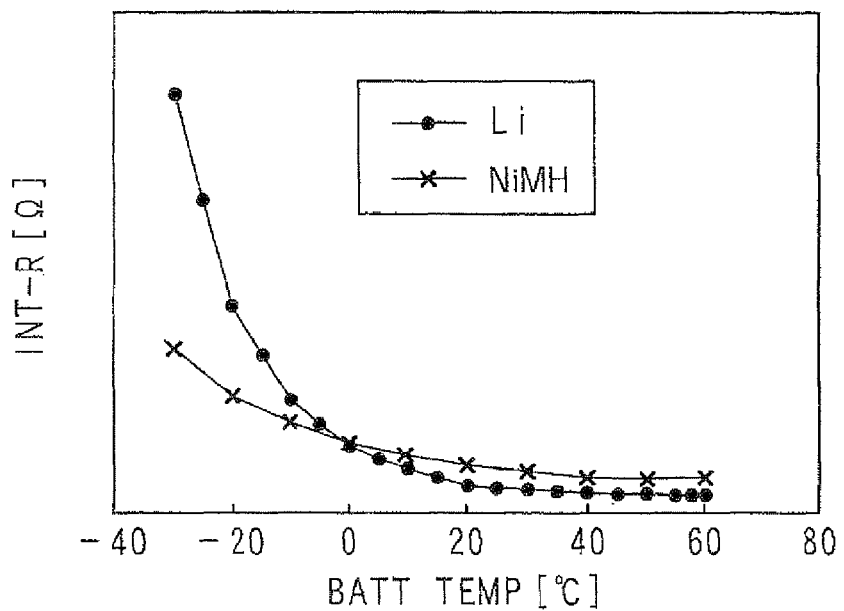
FIG. 4 is a diagram of relation between a battery temperature and the internal resistance of the battery.

When, the above equation 2 is plotted as a line graph on a coordinate plane with its horizontal axis Ib (battery current) and vertical axis of Vb (battery voltage), the internal resistance Ri corresponds to the inclination of the line of the battery current-voltage characteristics, and the open voltage Eo corresponds to the intercept of the line on the vertical axis. The inclination and the intercept respectively change depending on the battery conditions such as the battery current Ib, the battery voltage Vb, the battery temperature Tb, and the like. Therefore, the actual distribution of the battery currents Ib and the battery voltages Vb is illustrated as non-linear distribution. In this case, the internal resistance Ri of the battery 50 increases, as shown in FIG. 4, as the battery temperature Tb decreases. Therefore, in the present embodiment, the internal resistance Ri is estimated based on the battery temperature Tb.

Figure 5:
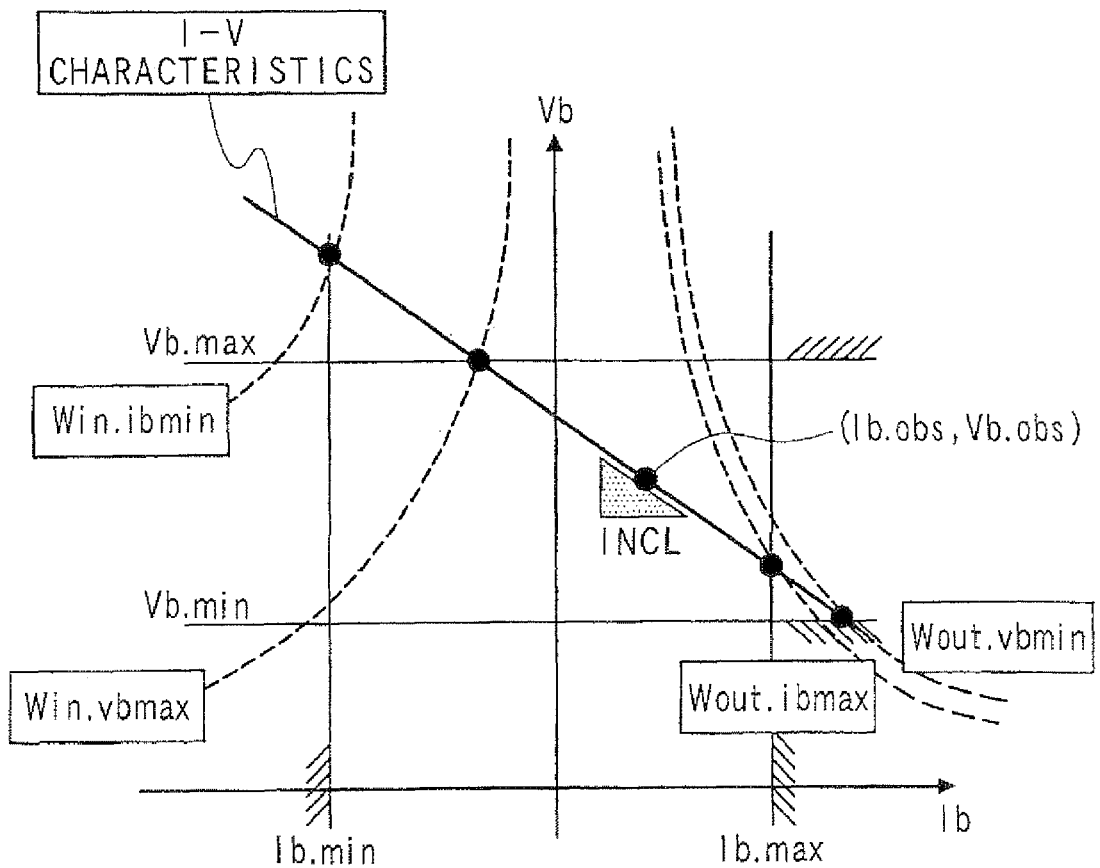
FIG. 5 is an illustration of a battery charge discharge control method in a first embodiment.

When the detection values of the battery current Ib and the battery voltage Vb are denoted as (Ib.obs, Vb.obs) and the battery current-voltage characteristics are approximated as a straight line (a linear approximation), the inclination of the current-voltage characteristics line corresponds to the internal resistance Ri, thereby making it possible to estimate the current-voltage characteristics line based on the detected values (Ib.obs, Vb.obs) and the internal resistance Ri (See FIG. 5).

To maximize the charge discharge capacity of the battery 50, the voltage use range determined by the battery characteristics and the current use range determined by the battery condition should be exploited (See FIG. 2). Therefore, when the current use range of the battery 50 is defined by the maximum and minimum values of (Ib.max, Ib.min) and the voltage use range of the battery 50 is defined by the maximum and minimum values of (Vb.max, Vb.min), the limit values (Win.ibmin, Wout.ibmax) of the charge discharge power are represented as intersections between (a) the current-voltage characteristics line having the inclination of the internal resistance Ri and passing the point of the detected battery current and voltage values (Ib.obs, Vb.obs) and (b) the lines defining the maximum and minimum values of the current use range (Ib.max, Ib.min) as shown in FIG. 5. In the following explanation, the charge power is represented as negative (i.e., in the '−': minus area) and the discharge power is represented as positive (i.e., in the '+': plus area).

[Discharge Limit Power Wout.ibmax Determined by the Maximum Value of the Current Use Range Ib.max]

$$Wout.ibmax = Ib.max \cdot (Eo.obs - Ri \cdot Ib.max) \quad \text{(Equation 3)}$$

[Charge Limit Power Win.ibmin Determined by the Minimum Value of the Current Use Range Ib.min]

$$Win.ibmin = Ib.min \cdot (Eo.obs - Ri \cdot Ib.min) \quad \text{(Equation 4)}$$

In the above equations 3 and 4, Eo.obs represents the open voltage (an intercept) calculated by a following equation 5.

$$Eo.obs = Vb.obs + Ib.obs \cdot Ri \quad \text{(Equation 5)}$$

In the same manner, the limit values of the charge discharge power are calculated as the intersections between the line having the inclination of the internal resistance Ri and passing the point of the detected battery current and voltage values (Ib.obs, Vb.obs) and the lines defining the maximum and minimum values of the voltage use range (Vb.max, Vb.min) as shown in FIG. 5.

[Charge Limit Power Win.vbmax Determined by the Maximum Value of the Voltage Use Range Vb.max]

$$Win.vbmax = -\{(Vb.max - Eo.obs)/Ri\} \cdot Vb.max \quad \text{(Equation 6)}$$

[Discharge Limit Power Wout.vbmin Determined by the Minimum Value of the Voltage Use Range Vb.min]

$$Wout.vbmin = -\{(Vb.min - Eo.obs)/Ri\} \cdot Vb.min \quad \text{(Equation 7)}$$

After comparing the two discharge Limit powers Wout.ibmax and Wout.vbmin calculated respectively by the expressions 3 and 7, the power value having the smaller absolute value is selected as a final discharge limit power Wout (the limit value of the discharge electric power).

$$Wout = Min(Wout.ibmax, Wout.vbmin) \quad \text{(Equation 8)}$$

After comparing the two charge limit powers Win.ibmin and Win.vbmax calculated respectively by the expressions 4 and 6, the power value having the smaller absolute value is selected as a final charge limit power Win (the limit value of the charge electric power).

$$\begin{aligned}Win &= Max(Win.ibmin, Win.vbmax) \\ &= -Min(|Win.ibmin|, |Win.vbmax|)\end{aligned} \quad \text{(Equation 9)}$$

In this case, two charge limit powers Win.ibmin and Win.vbmax respectively have a negative value.

The approximation of the battery current-voltage characteristics may not only performed by a linear model (a linear expression) but also performed by a non-linear model such as a quadratic expression or an expression of third degree, in order to achieve the increased approximation accuracy. When the non-linear model is employed, a map prepared by sampling the current-voltage characteristics may be used to calculate the limit values of the charge discharge power.

The charge discharge control described above is performed by the hybrid ECU 70. That is, the hybrid ECU 70 uses a charge discharge control routine shown in FIG. 6 for the charge discharge control of the battery 50.

Figure 6:
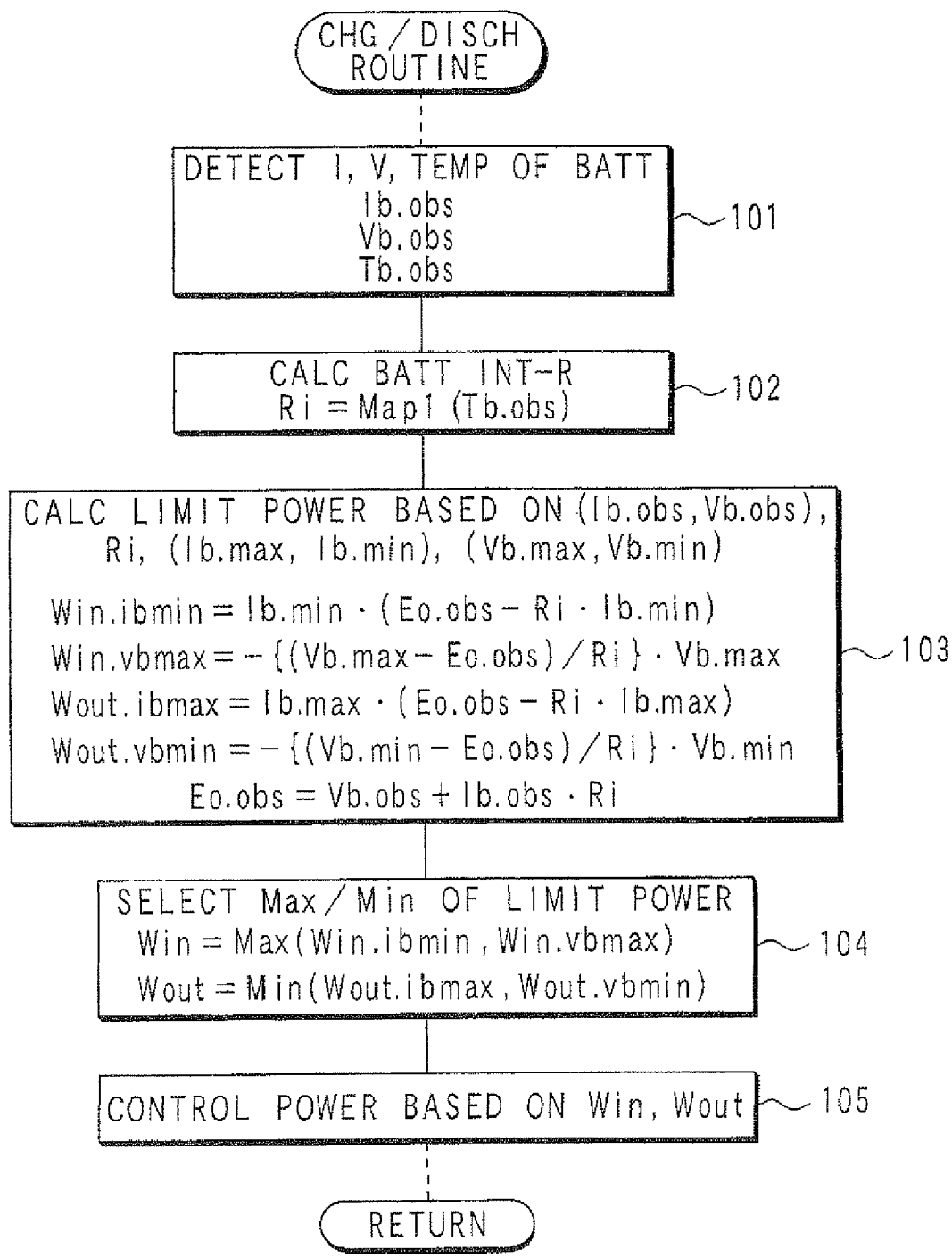
FIG. 6 is a flowchart of a process of a charge discharge control routine in the first embodiment.

The execution of the charge discharge control routine in FIG. 6 is performed repeatedly at a scheduled interval while an ignition switch 80 is turned on. When the routine is started, the battery current (designated as "detected current" hereinafter) Ib.obs detected by the current sensor 56 and the battery voltage (designated as "detected voltage" hereinafter) Vb.obs detected by the voltage sensor 55 and the battery temperature (designated as "detected termperature" hereinafter) Tb.obs detected by the temperature sensor 51 are retrieved in step 101.

Then, in step 102, the internal resistance Ri is calculated according to the detected temperature Tb.obs. The calculation is performed by referring to a Map 1 in FIG. 7 and by using the battery temperature as its parameter.

$$Ri = Map1(Tb.obs)$$

The process in step 102 serves as an internal resistance estimation unit in the claim language.

In step 103, four charge discharge powers are calculated by using the detected current Ib.obs, the detected voltage Vb.obs, the maximum and minimum values of the current use range (Ib.max, Ib.min) and the maximum and minimum values of the voltage use range (Vb.max, Vb.min).

[Charge Limit Power Win.ibmin Determined by the Minimum Value of the Current Use Range Ib.min]

$$Win.ibmin = Ib.min \cdot (Eo.obs - Ri \cdot Ib.min)$$

[Charge Limit Power Win.vbmax Determined by the Maximum Value of the Voltage Use Range Vb.max]

$$Win.vbmax = -\{(Vb.max - Eo.obs)/Ri\} \cdot Vb.max$$

[Discharge Limit Power Wout.ibmax Determined by the Maximum Value of the Current Use Range Ib.max]

$$Wout.Ibmax = Ib.max \cdot (Eo.obs - Ri \cdot Ib.max)$$

[Discharge Limit Power Wout.vbmin Determined by the Minimum Value of the Voltage Use Range Vb.min]

$$Wout.vbmin = -\{(Vb.min - Eo.obs)/Ri\} \cdot Vb.min$$

In this case, the following relation Eo.obs=Vb.obs+Ib.obs·Ri is applied.

In step 104, from among two charge limit powers Win.ibmin and Win.vbmax respectively calculated from the relevant conditions, the smaller absolute value is selected as the final charge limit power Win by the comparison.

$$Win = \text{Max}(Win.ibmin, Win.vbmax)$$

In this case, two charge limit powers Win.ibmin, Win.vbmax respectively have a minus value.

Further, from among two discharge limit powers Wout.ibmax and Wout.vbmin respectively calculated from the relevant conditions, the smaller absolute value is selected as the final discharge limit power Wout by the comparison.

$$Wout = \text{Min}(Wout.ibmax, Wout.vbmin)$$

In step 105, the battery charge power and the battery discharge power is controlled not to surpass the above-described final limit power Win and Wout calculated in step 104 (i.e., a guard process is performed). For example, the required charge discharge power is used as the target power for the charge discharge control of the battery 50 without change if the required power is within the limit value (Win, Wout), and, the limit value (Win, Wout) of the charge discharge power is used as the target power for the charge discharge control of the battery 50 if the required power is not within the limit value (Win, Wout). These steps 103 to 105 serve as a charge discharge power control unit in the claim language.

In the present embodiment, the battery current/voltage/temperature are either detected or estimated for controlling the battery current/voltage to be within the use range. Therefore, the battery current and battery voltage are prevented from surpassing the respective use ranges in consideration of the battery condition (i.e., the internal resistance) by limiting the charge discharge power of the battery 50. In other words, generation of the excessive heat due to the excess of the battery current/voltage is prevented while maximizing the charge discharge characteristics of the battery 50.

Second Embodiment

In the above embodiment, the battery 50 is assumed to have an internal resistance that is inversely proportional to the battery temperature. In the present embodiment, the battery current and battery voltage are sampled at least two points, for the calculation of the inclination and intercept of the linear approximation. In the following description of the present embodiment, how to calculate the parameters (an inclination mb, and an intercept Vb.o) of the current-voltage characteristics equation based on the current/voltage samples detected by the current sensor 56 and the voltage sensor 55 for the calculation of the limit value is explained. The calculation of the limit value of the charge discharge power is possible in the above-described manner, because the inclination mb of the current-voltage characterisitics equation can be used as the internal resistance of the battery 50.

For example, the relation between the battery voltage Vb and battery electric current Ib is represented by the following equation when the current-voltage characteristics of the battery 50 is modeled as a linear approximation of a straight line (i.e., a linear equation).

$$Vb = Vb.o + mb \cdot Ib \qquad \text{(Equation 10)}$$

The parameter Vb.o is the intersection between the vertical axis and the current-voltage characteristics line (i.e., an intercept), and the parameter mb is inclination of the straight line of the current-voltage characteristics (i.e., an internal resistance).

The inclination mb of the current-voltage characteristics line and its intercept Vb.o are calculated by the following equations when (a) the battery voltage Vb and the battery current Ib are sampled at an interval of $\Delta t$ second. That is, the detected value of the battery current Ib and the battery voltage Vb are respectively represented as (Ib.obs[i], Vb.obs[i]) for the current sample, and as (Ib.obs[i−1], Vb.obs[i−1]) for the previous sample that is sampled $\Delta t$ second before.

$$mb = (Vb.obs[i] - Vb.obs[i-1])/(Ib.obs[i] - Ib.obs[i-1])$$

$$Vb.o = Vb.obs[i] - mb \cdot Ib.obs[i]$$

By using the parameters mb and Vb.o calculated in the above, the change of the battery current Ib and the change of the battery voltage Vb are predicted based on the characteristics equation.

In the present embodiment, the current-voltage characteristics are approximated by a linear equation. However, the approximation may employ a quadratic equation or a polynomial of higher degrees. That is, the approximation may be performed in a non-Linear manner. When the non-Linear approximation is used, the number of current-voltage samples is increased for accommodating the increased number of parameters in the non-linear equation.

Figure 8:
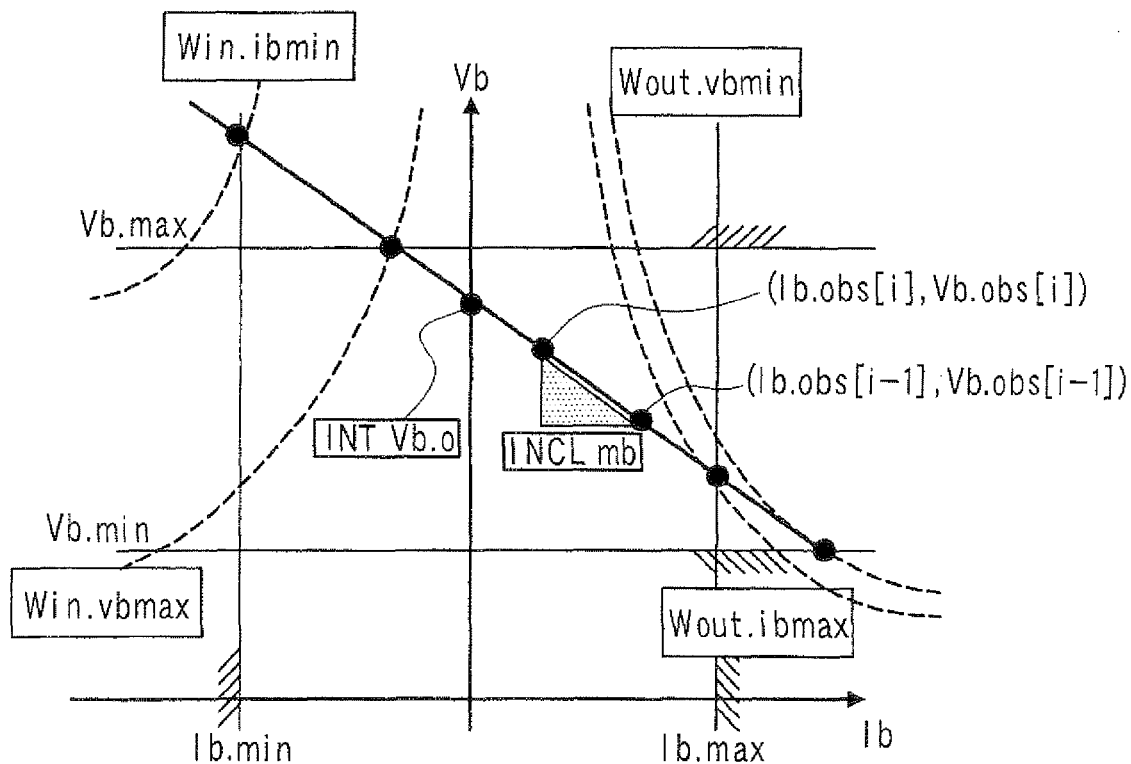
FIG. 8 is an illustration of a battery charge discharge control method in a second embodiment.

Once the current-voltage characteristics are model by an equation, four limit power values can be calculated based on the intersections between the graph of the current-voltage characteristics model of the battery 50 and the four 3D lines of boundaries, that is, the maximum/minimum values of the current use range (Ib.max, Ib.min) and the maximum/minimum values of the voltage use range (Vb.max, Vb.min) shown in FIG. 8.

[Charge Limit Power Win.ibmin Determined by the Minimum Value of the Current Use Range Ib.min]

$$Win.ibmin = Ib.min \cdot (Vb.o + mb \cdot Ib.min)$$

[Charge Limit Power Win.vbmax Determined by the Maximum Value of the Voltage Use Range Vb.max]

$$Win.vbmax = \{(Vb.max - Vb.o)/mb\} \cdot Vb.max$$

[Discharge Limit Power Wout.ibmax Determined by the Maximum Value of the Current Use Range Ib.max]

$$Wout.ibmax = Ib.max \cdot (Vb.o + mb \cdot Ib.max)$$

[Discharge Limit Power Wout.vbmin Determined by the Minimum Value of the Voltage Use Range Vb.min]

$$Wout.vbmin = \{(Vb.min - Vb.o)/mb\} \cdot Vb.min$$

Then, the smaller absolute value of two charge limit powers Win.ibmin and Win.vbmax is selected as a final charge limit power Win, $$\begin{aligned} Win &= \text{Max}(Win.ibmin, Win.vbmax) \\ &= -\text{Min}(|Win.ibmin|, |Win.vbmax|) \end{aligned}$$

In this case, two charge limit powers Win.ibmin, Win.vbmax respectively have a minus value.

Likewise, the smaller absolute value of two discharge limit powers Wout.ibmax and Wout.vbmin is selected as a final discharge limit power Wout (i.e., a limit value of the discharge power).

$$Wout = \text{Min}(Wout.ibmax, Wout.vbmin)$$

The charge discharge control of the present embodiment is performed by the hybrid ECU 70. That is, the hybrid ECU 70 uses a charge discharge control routine shown in FIG. 9 for the charge discharge control of the battery 50.

Figure 9:
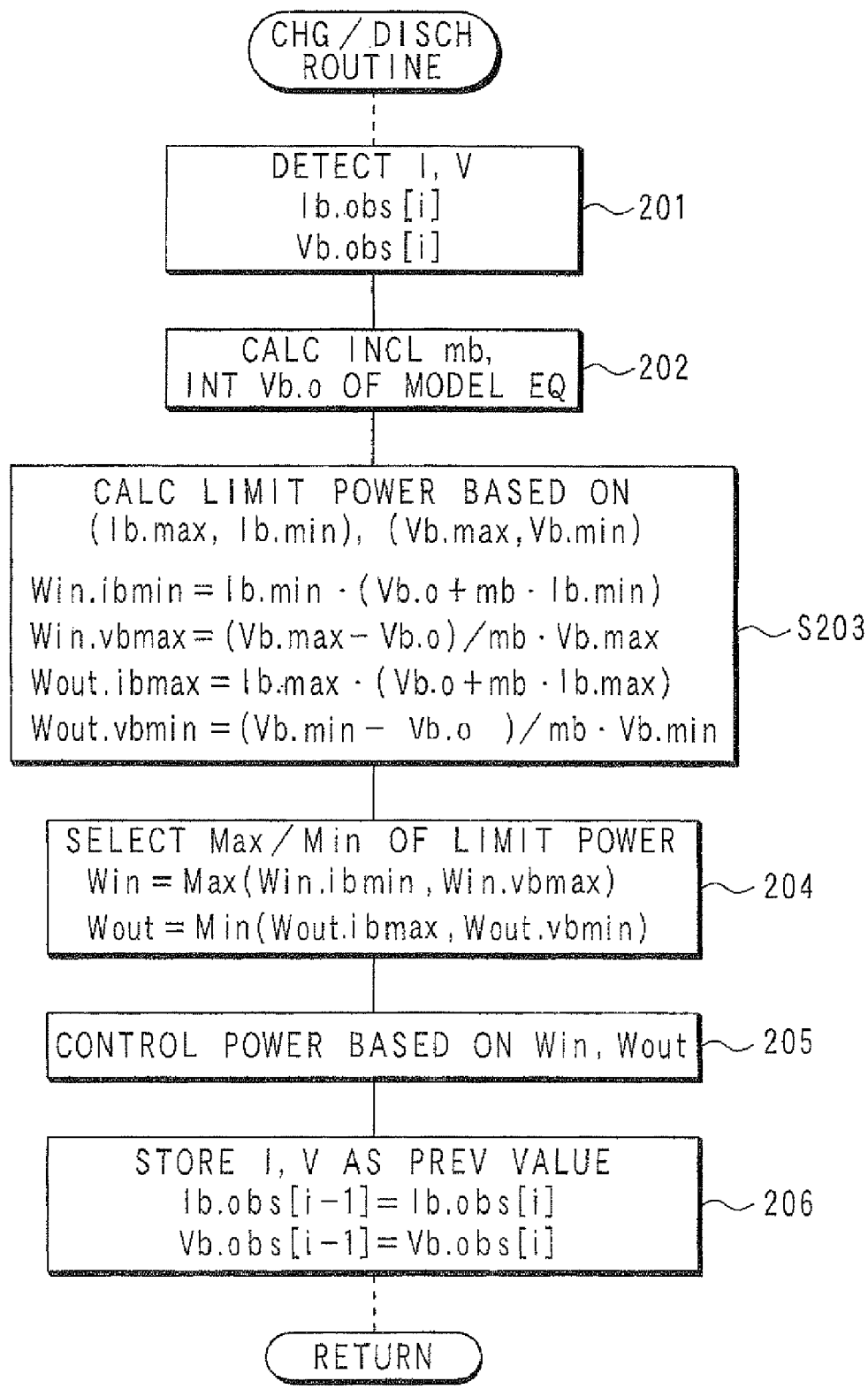
FIG. 9 is a flowchart of a process of a charge discharge control routine in the second embodiment.

The execution of the charge discharge control routine in FIG. 9 is performed repeatedly at a scheduled interval while the ignition switch 80 is turned on. When the detected current Ib.obs[i] and the detected voltage Vb.obs[i] detected by the current sensor 56 and the voltage sensor 55 are retrieved in step 201.

In step 202, two parameters, that is, the inclination mb and the intercept Vb.o of the linear approximation model of the current-voltage characteristics of the battery 50 are calculated by using the following equations.

$$mb=(Vb.obs[i]-Vb.obs[i-1])/(Ib.obs[i]-Ib.obs[i-1])$$

$$Vb.o=Vb.obs[i]-mb \cdot Ib.obs[i]$$

The step 202 serves as a current-voltage characteristic estimation unit in the claim language.

In step 203, the four charge discharge limit powers are calculated by using the linear approximation equation, the maximum and minimum values of the current use range (Ib.max, Ib.min) and the maximum and minimum values of the voltage use range (Vb.max, Vb.min).

[Charge Limit Power Win.ibmin Determined by the Minimum Value of the Current Use Range Ib.min]

$$Win.ibmin=Ib.min \cdot (Vb.o+mb \cdot Ib.min)$$

[Charge Limit Power Win.vbmax Determined by the Maximum Value of the Voltage Use Range Vb.max]

$$Win.vbmax=\{(Vb.max-Vb.o)/mb\} \cdot Vb.max$$

[Discharge Limit Power Wout.ibmax Determined by the Maximum Value of the Current Use Range Ib.max]

$$Wout.ibmax=Ib.max \cdot (Vb.o+mb \cdot Ib.max)$$

[Discharge Limit Power Wout.vbmin Determined by the Minimum Value of the Voltage Use Range Vb.min]

$$Wout.vbmin=\{(Vb.min-Vb.o)/mb\} \cdot Vb.min$$

In step 204, the smaller absolute value of two charge limit powers Win.ibmin and Win.vbmax is selected as a final charge limit power Win.

$$Win=Max(Win.ibmin,Win.vbmax)$$

In this case, two charge limit powers Win.ibmin, Win.vbmax respectively have a minus value.

Likewise, the smaller absolute value of two discharge limit powers Wout.ibmax and Wout.vbmin is selected as a final discharge limit power Wout (i.e., a limit value of the discharge power).

$$Wout=Min(Wout.ibmax,Wout.vbmin)$$

In step 205, the battery charge power and the battery discharge power for the battery 50 is controlled not to surpass the above-described final limit powers Win and Wout calculated in step 204 (i.e., a guard process is performed).

In step 206, for the subsequent calculation step, the detected current Ib.obs[i] and the detected voltage Vb.obs[i] are memorized as Ib.obs[i-1] and Vb.obs[i-1]. Then, the execution of the control routine is concluded.

In the present embodiment, at least two samples of the battery current and the battery voltage from the current sensor 56 and the voltage sensor 55 are retrieved for determining the linear approximation model of the current-voltage characterisitics, that is, the inclination mb and the intercept Vb.o of the linear equation. Therefore, the internal resistance of the battery 50 can be calculated without detecting/estimating the battery temperature of the battery 50. In other words, the inclination mb of the linear equation is used as the internal resistance of the battery 50. As a result, the internal resistance of the battery 50 is taken into account of the calculation of the limit values of the charge discharge power. Therefore, the advantage of the present disclosure, that is, the charge discharge characteristics of the battery 50 being maximized without generating excessive heat, is achieved.

Third Embodiment

Figure 10:
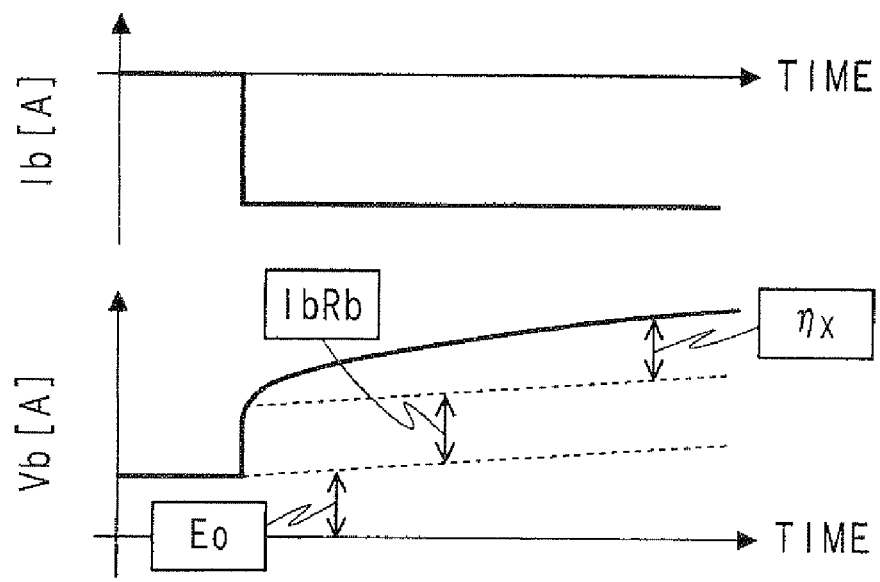
FIG. 10 is a time chart of voltage change in a step charge process of the battery.
Figure 11:
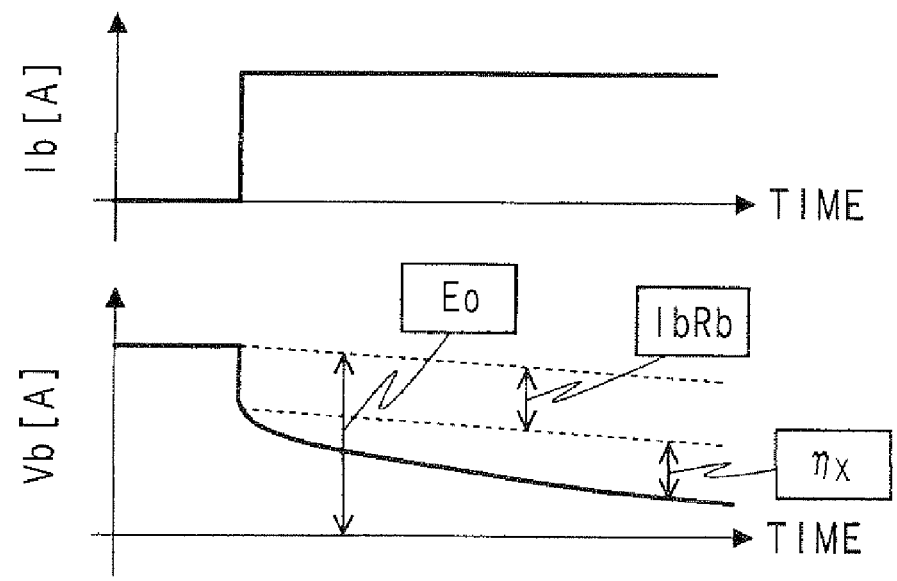
FIG. 11 is a time chart of voltage change in a step discharge process of the battery.

The actual current-voltage characteristics of the battery 50 is non-linear, due to the change of the open voltage Eo and the polarization voltage $\eta x$. More specifically, as shown in FIGS. 10 and 11, the continuation of a large current, the amount of change of the open voltage Eo and the polarization voltage $\eta x$ increases. Therefore, the approximation of the current-voltage characteristics of the battery 50 may preferably be conducted by using a more complex model equation, in terms of achieving an improved accuracy of the current/voltage control. However, the complex model of the current-voltage characteristics demands increased process for the calculation of the parameters of the complex model.

Therefore, the difference between the maximum/minimum values of the current use range (Ib.max, Ib.min) and the detected current Ib.obs is calculated as a margin, and the difference between the maximum/minimum values of the voltage use range (Vb.max, Vb.min) and the detected voltage Vb.obs is also calculated as the margin in the present embodiment. The assumption is that, when the margin is greater, the diversion from the linear approximation becomes greater. That is, the margin is considered in the calculation of charge discharge limit power of the present embodiment.

Figure 12:
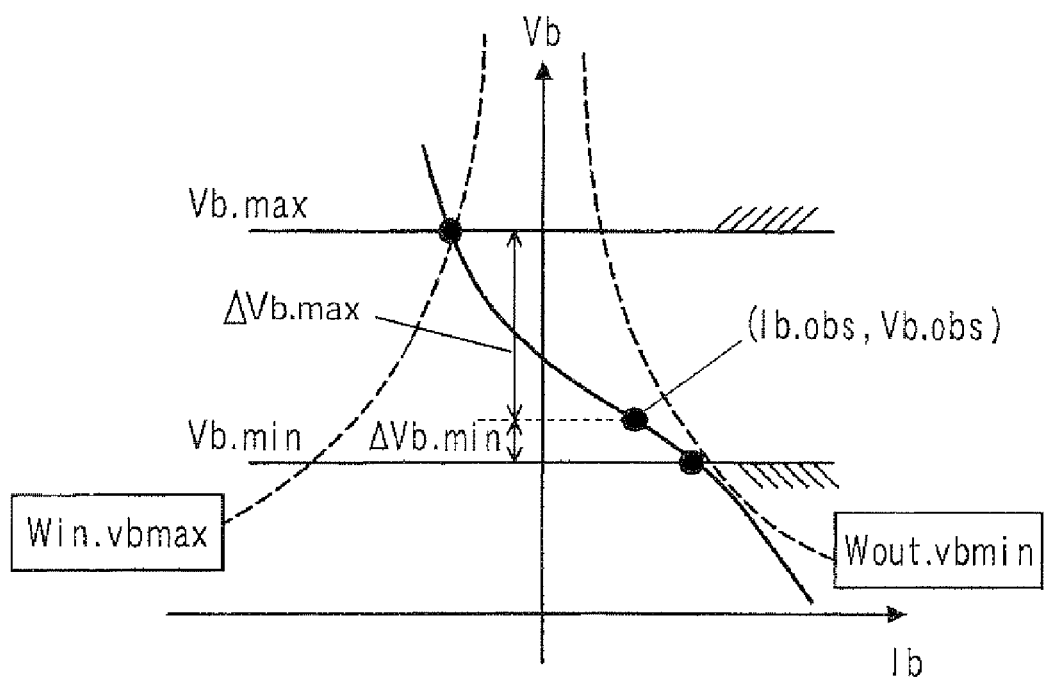
FIG. 12 is an illustration of a battery charge discharge control method in a third embodiment.

That is, a charge voltage margin $\Delta Vb.max$ and a discharge voltage margin $\Delta Vb.min$ are respectively defined in the following manner as shown in FIG. 12.

$$\Delta Vb.max=Vb.max-Vb.obs$$

$$\Delta Vb.min=Vb.min-Vb.obs$$

The charge discharge limit powers based on the maximum and minimum values of the voltage use range (Vb.max, Vb.min) are calculated by using the following equations.

[Charge Limit Power Win.vbmax Determined by the Maximum Value of the Voltage Use Range Vb.max]

$$Win.vbmax=f31(Ib.obs,Vb.obs,Ri,\Delta Vb.max)$$

The f31 in the above equation is either of a map or an equation for the calculation of the charge limit power Win.vbmax by using the parameters of the detected current Ib.obs, the detected voltage Vb.obs, the internal resistance RI, and the charge voltage margin $\Delta Vb.max$.

[Discharge Limit Power Wout.vbmin Determined by the Minimum Value of the Voltage Use Range Vb.min]

$$Wout.vbmin=g31(Ib.obs,Vb.obs,Ri,\Delta Vb.min)$$

The g31 in the above equation is either of a map or an equation for the calculation of the charge limit power Wout.vbmin by using the parameters of the detected current Ib.obs, the detected voltage Vb.obs, the internal resistance Ri, and the discharge voltage margin $\Delta Vb.min$.

Further, a charge current margin $\Delta Ib.max$ and a discharge current margin $\Delta Ib.min$ are respectively defined in the following manner.

$$\Delta Ib.max=Ib.max-Ib.obs$$

$$\Delta Ib.min=Ib.min-Ib.obs$$

The charge discharge limit powers based on the maximum and minimum values of the current use range (Ib.max, Ib.min) are calculated by using the following equations.

[Discharge Limit Power Wout.ibmax Determined by the Maximum Value of the Current Use Range Ib.max]

$$Wout.ibmax = f32(Ib.obs, Vb.obs, Ri, \Delta Ib.max)$$

The f32 in the above equation is either of a map or an equation for the calculation of the charge limit power Wout.ibmax by using the parameters of the detected current Ib.obs, the detected voltage Vb.obs, the internal resistance Ri, and the charge current margin ΔIb.max.

[Charge Limit Power Win.ibmin Determined by the Minimum Value of the Current Use Range Ib.min]

$$Win.ibmin = g32(Ib.obs, Vb.obs, Ri, \Delta Ib.min)$$

The g32 in the above equation is either of a map or an equation for the calculation of the charge limit power Win.ibmin by using the parameters of the detected current Ib.obs, the detected voltage Vb.obs, the internal resistance Ri, and the discharge current margin ΔIb.min.

Based on the calculation of the four limit powers described above, the final charge discharge limit powers Win and Wout are determined in the same manner as the previous embodiments.

The charge discharge control described above is performed by the hybrid ECU 70. That is, the hybrid ECU 70 uses a charge discharge control routine shown in FIG. 13 for the charge discharge control of the battery 50.

Figure 7:
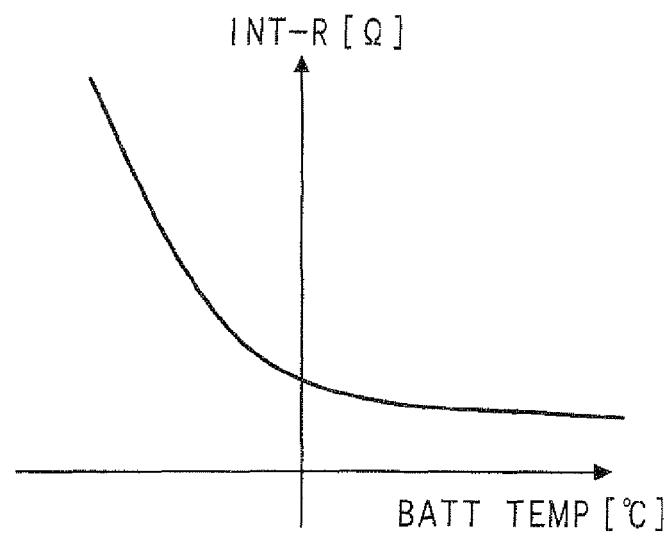
FIG. 7 is an example of a map for the calculation of the internal resistance of the battery based on the battery temperature.
Figure 13:
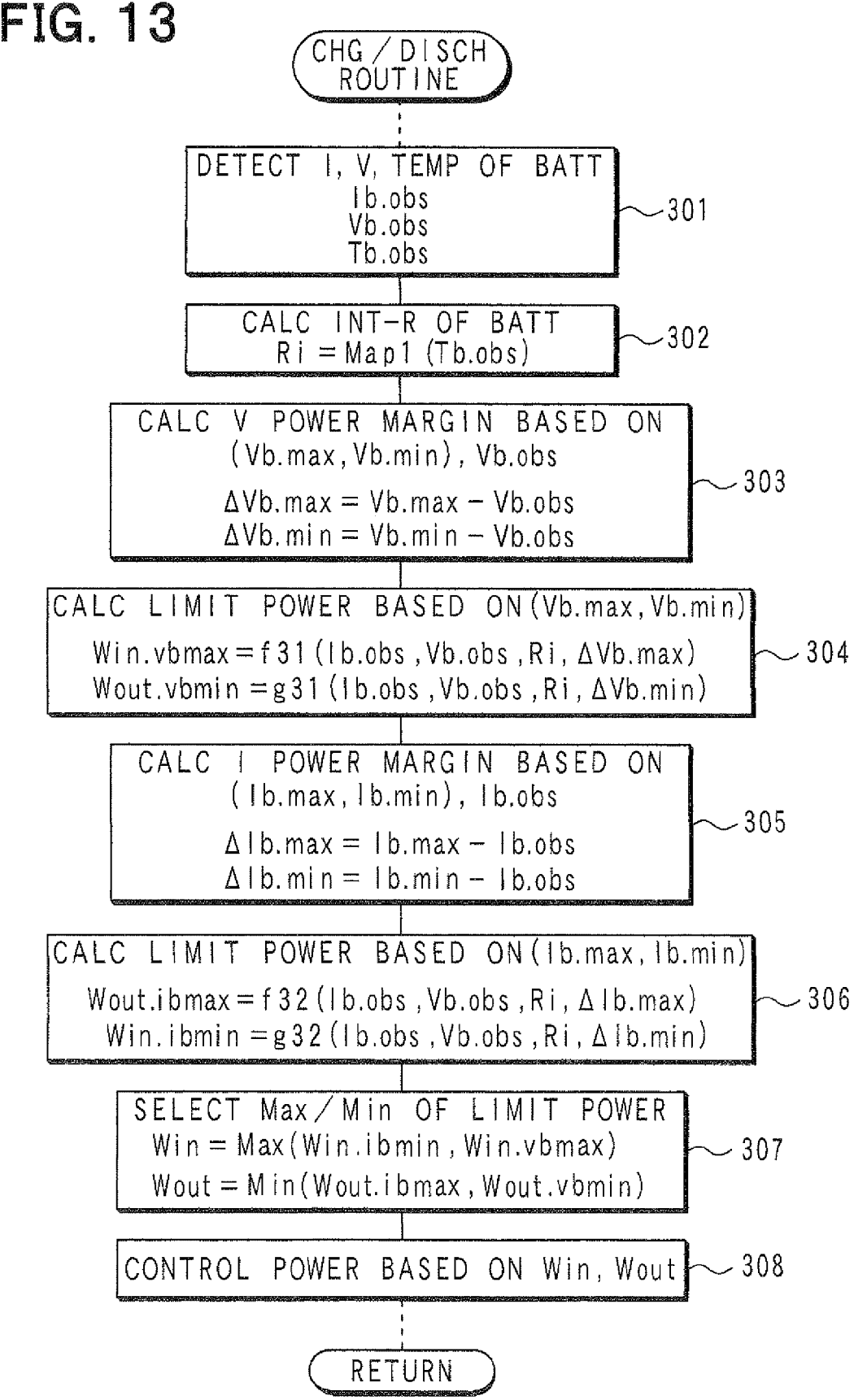
FIG. 13 is a flowchart of a process of a charge discharge control routine in the third embodiment.

The execution of the charge discharge control routine in FIG. 13 is performed repeatedly at a scheduled interval while the ignition switch 80 is turned on. When the routine is started, the battery current Ib.obs detected by the current sensor 56 and the battery voltage Vb.obs detected by the voltage sensor 55 and the battery temperature Tb.obs detected by the temperature sensor 51 are retrieved in step 301. Then, in step 302, the map1 in FIG. 7 is referred to for the calculation of the internal resistance Ri according to the current detected temperature Tb.obs.

$$Ri = Map1(Tb.obs)$$

In step 303, the charge voltage margin ΔVb.max and the discharge voltage margin ΔVb.min are calculated by subtracting the detected battery voltage Vb.obs from the maximum and minimum values of the voltage use range (Vb.max, Vb.min).

$$\Delta Vb.max = Vb.max - Vb.obs$$

$$\Delta Vb.min = Vb.min - Vb.obs$$

In step 304, maps f31, g31 are used for the calculation of two limit powers based on the maximum and minimum values of the voltage use range (Vb.max, Vb.min).

[Charge Limit Power Win.vbmax Determined by the Maximum Value of the Voltage Use Range Vb.max]

$$Win.vbmax = f31(Ib.obs, Vb.obs, Ri, \Delta Vb.max)$$

[Discharge Limit Power Wout.vbmin Determined by the Minimum Value of the Voltage Use Range Vb.min]

$$Wout.vbmin = g31(Ib.obs, Vb.obs, Ri, \Delta Vb.min)$$

In step 305, the discharge current margin ΔIb.max and the charge current margin ΔVb.min are calculated by subtracting the detected battery current Ib.obs from the maximum and minimum values of the current use range (Ib.max, Ib.min).

$$\Delta Ib.max = Ib.max - Ib.obs$$

$$\Delta Ib.min = Ib.min - Ib.obs$$

In step 306, maps f32, g32 are used for the calculation of two limit powers based on the maximum and minimum values of the current use range (Ib.max, Ib.min).

[Discharge Limit Power Wout.ibmax Determined by the Maximum Value of the Current Use Range Ib.max]

$$Wout.ibmax = f32(Ib.obs, Vb.obs, Ri, \Delta Ib.max)$$

[Charge Limit Power Wout.vbmin Determined by the Minimum Value of the Voltage Use Range Vb.min]

$$Win.ibmin = g32(Ib.obs, Vb.obs, Ri, \Delta Ib.min)$$

In step 307, the smaller absolute value is selected as the final charge limit power Win by the comparison of two limit powers Win.ibmin and Win.vbmax.

$$Win = Max(Win.ibmin, Win.vbmax)$$

In this case, two charge limit powers Win.ibmin, Win.vbmax respectively have a minus value.

In addition, the smaller absolute value is selected as the final discharge limit power Wout by the comparison of two limit powers Wout.ibmax and Wout.vbmin.

$$Wout = Min(Wout.ibmax, Wout.vbmin)$$

In step 308, the battery charge power and the battery discharge power is controlled not to surpass the above-described final limit power Win and Wout calculated in step 307. That is, a guard process is performed.

In the present embodiment described above, the difference between the maximum/minimum values of the current use range (Ib.max, Ib.min) and the detected current Ib.obs is calculated as a margin, and the difference between the maximum/minimum values of the voltage use range (Vb.max, Vb.min) and the detected voltage Vb.obs is also calculated as the margin, and an assumption that the diversion from the linear approximation becomes greater when the margin is greater is employed. Therefore, the charge discharge limit power of the battery 50 is accurately controlled without increasing the CPU process load, even when the actual charge discharge characteristics of the battery 50 divert from the linear approximation.

Fourth Embodiment

In the embodiments described above, the internal resistance Ri (or the inclination mb) of the battery 50 is estimated. However, the improvement of the power control accuracy may lead to the increased process load for the CPU. That is, if a highly accurate model and/or map is employed, the calculation of the power control increases.

Therefore, in the present embodiment, the charge discharge limit power is determined based on the margins that are calculated as the difference between the maximum/minimum values of the current use range (Ib.max, Ib.min) and the detected current Ib.obs and the difference between the maximum/minimum values of the voltage use range (Vb.max, Vb.min) and the detected voltage Vb.obs, without performing the internal resistance estimation process for the purpose of decreasing the CPU process load, as shown in FIGS. 14 to 18.

The charge discharge control described above is performed by the hybrid ECU 70 in the following manner. That is, the hybrid ECU 70 uses a charge discharge control routine shown in FIG. 14 for the charge discharge control of the battery 50.

Figure 14:
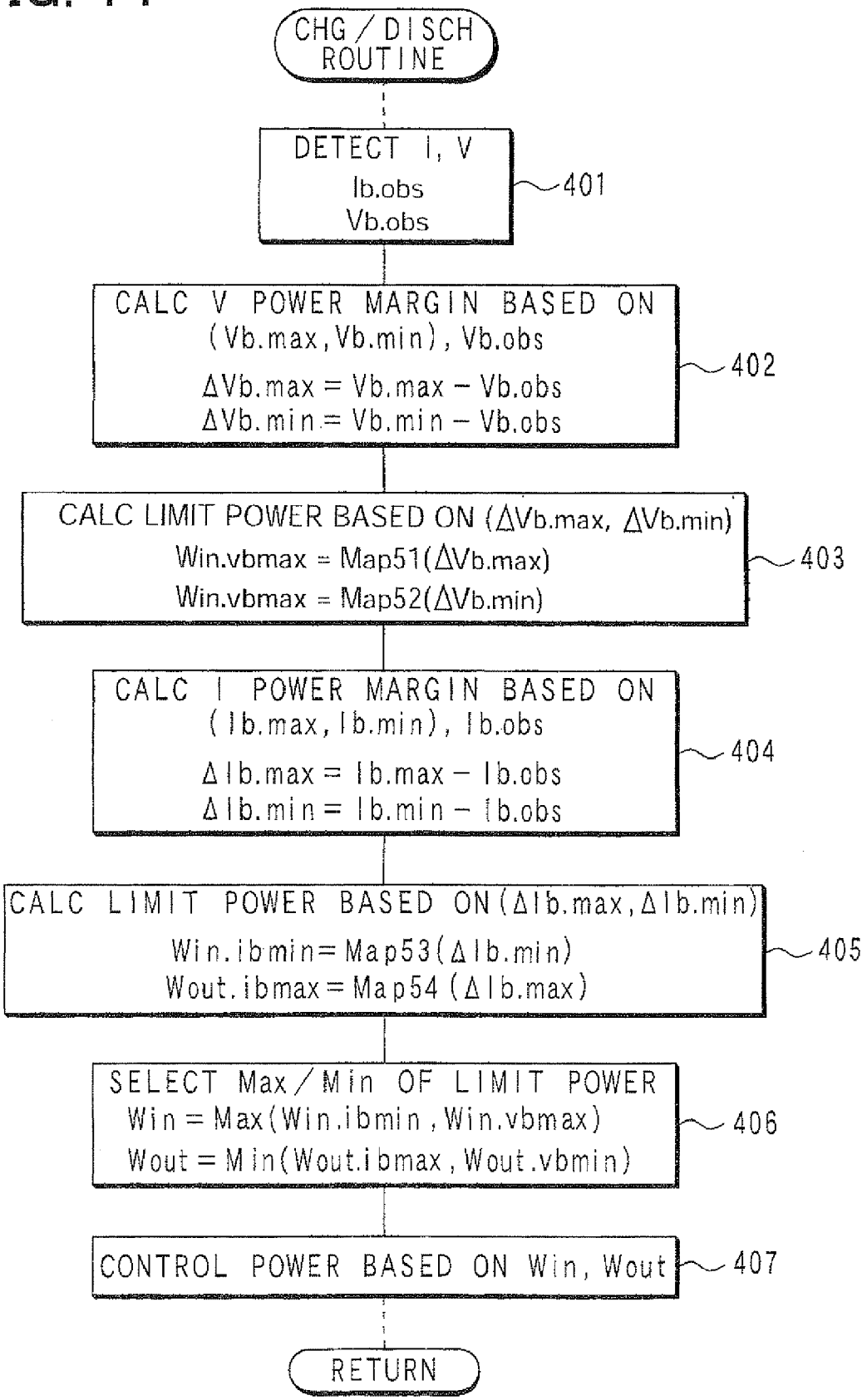
FIG. 14 is a flowchart of a process of a charge discharge control routine in a fourth embodiment.

The execution of the charge discharge control routine in FIG. 14 is performed repeatedly at a scheduled interval while the ignition switch 80 is turned on. When the routine is started, the battery current Ib.obs detected by the current sensor 56 and the battery voltage Vb.obs detected by the voltage sensor 55 are retrieved in step 401. Then, in step 402, the charge voltage margin ΔVb.max and the discharge voltage margin ΔVb.min are calculated by subtracting the detected battery voltage Vb.obs from the maximum and minimum values of the voltage use range (Vb.max, Vb.min).

$$\Delta Vb.\max = Vb.\max - Vb.obs$$

$$\Delta Vb.\min = Vb.\min - Vb.obs$$

Figure 15:
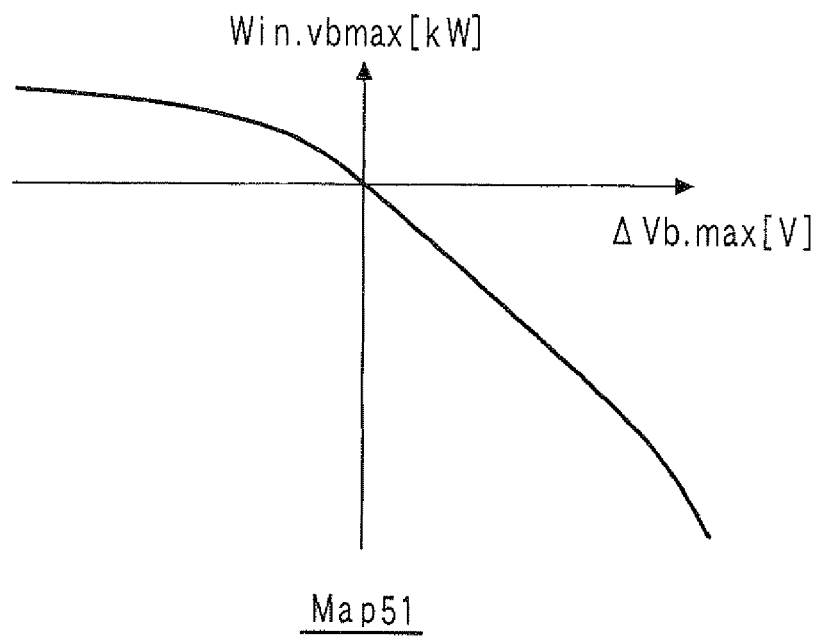
FIG. 15 is an example of a map for the calculation of a charge limit power based on a charge voltage margin.
Figure 16:
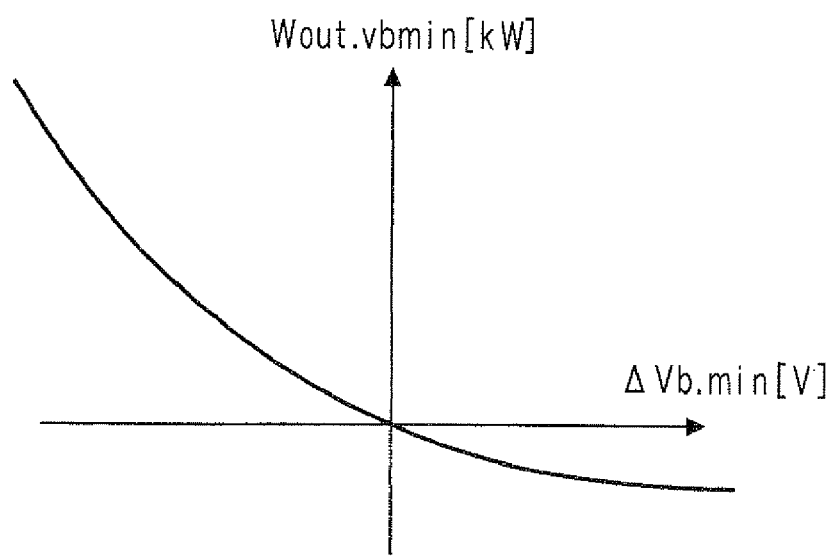
FIG. 16 is an example of a map for the calculation of a discharge limit power based on a discharge voltage margin.

In step 403, the calculation of two limit powers is performed by applying the voltage margins ΔVb.max and ΔVb.min to the maps 51 and 52 respectively shown in FIGS. 15 and 16.

[Charge Limit Power Win.vbmax Determined by the Maximum Value of the Voltage Use Range Vb.max]

$$Win.vb\max = Map51(\Delta Vb.\max)$$

[Discharge Limit Power Wout.vbmin Determined by the Minimum Value of the Voltage Use Range Vb.min]

$$Wout.vb\min = Map52(\Delta Vb.\min)$$

In both of the maps 51 and 52 shown in FIGS. 15 and 16, the discharging is represented as a plus value, and the charging is represented as a minus value.

In step 404, the discharge current margin ΔIb.max and the charge current margin ΔVb.min are calculated by subtracting the detected battery current Ib.obs from the maximum and minimum values of the current use range (Ib.max, Ib.min).

$$\Delta Ib.\max = Ib.\max - Ib.obs$$

$$\Delta Ib.\min = Ib.\min - Ib.obs$$

Figure 17:
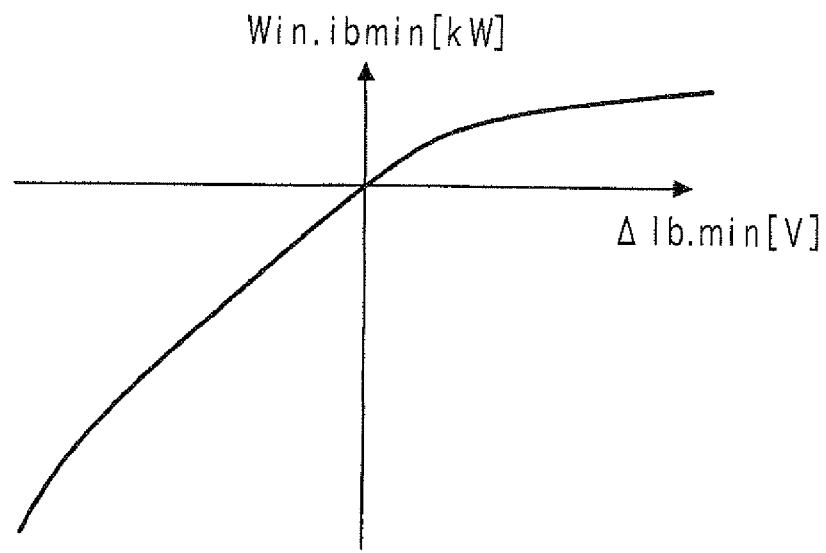
FIG. 17 is an example of a map for the calculation of the charge limit power based on a charge current margin.
Figure 18:
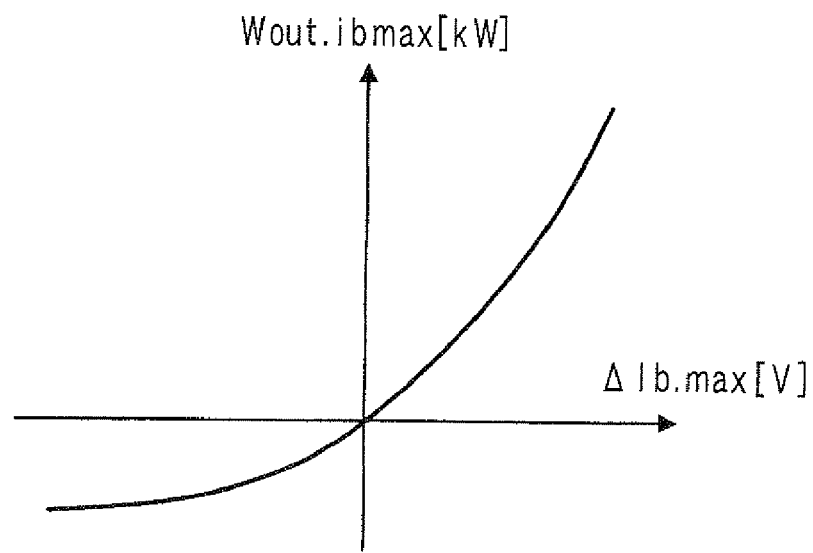
FIG. 18 is an example of a map for the calculation of the discharge limit power based on a discharge current margin.

In step 405, the calculation of two limit powers is performed by applying the two margins ΔIb.max and ΔIb.min to the map 53 in FIG. 17 and the map 54 in FIG. 18.

[Discharge Limit Power Wout.ibmax Determined by the Maximum Value of the Current Use Range Ib.max]

$$Win.ib\min = Map53(\Delta Ib.\min)$$

[Charge Limit Power Wout.vbmin Determined by the Minimum Value of the Voltage Use Range Vb.min]

$$Wout.ib\max = Map54(\Delta Ib.\max)$$

In both of the maps 53 and 54 shown in FIGS. 17 and 18, the discharging is represented as a plus value, and the charging is represented as a minus value.

In step 406, the smaller absolute value is selected as the final charge limit power Win by the comparison of two limit powers Win.ibmin and Win.vbmax.

$$Win = Max(Win.ib\min, Win.vb\max)$$

In this case, two limit values Win.ibmin, Win.vbmax are a minus value respectively.

In addition, the smaller absolute value is selected as the final discharge limit power Wout by the comparison of two limit powers Wout.ibmax and Wout.vbmin.

$$Wout = Min(Wout.ib\max, Wout.vb\min)$$

In step 407, the battery charge power and the battery discharge power is controlled not to surpass the above-described final limit power Win and Wout calculated in step 307. That is, a guard process is performed.

In the present embodiment described above, without performing the internal resistance estimation process, the difference between the maximum/minimum values of the current use range (Ib.max, Ib.min) and the detected current Ib.obs is calculated as a margin, and the difference between the maximum/minimum values of the voltage use range (Vb.max, Vb.min) and the detected voltage Vb.obs is also calculated as the margin, for the purpose of calculating the charge discharge limit power based on those margins. Therefore, the calculation of the charge discharge limit power of the battery 50 is performed in a simplified manner without the estimation of the internal resistance Ri (or the inclination mb), while preventing the generation of the excessive heat from the battery 50 without compromising the maximum exploitation of the charge discharge characteristics of the battery 50 by limiting both of the battery current and the battery voltage within the respective use ranges.

Although the present disclosure has been fully described in connection with preferred embodiment thereof with reference to the accompanying drawings, it is to be noted that various changes and modifications will become apparent to those skilled in the art. For example, the operation scheme described above may be used not only in a hybrid vehicle, but also in an electric vehicle which is driven only by a motor. Further, the present operation scheme may be used for charging and discharging of a battery in a vehicle having the engine only as a source of its driving force.

Such changes, modifications, and summarized schemes are to be understood as being within the scope of the present disclosure as defined by appended claims.

What is claimed is:

1. A battery charge discharge control apparatus for controlling a battery charge discharge power of a battery in a vehicle comprising:
   a current detector for detecting a battery current;
   a voltage detector for detecting a battery voltage;
   an internal resistance estimation unit for estimating an internal resistance of the battery; and
   a charge discharge power control unit for setting a limit value of the battery charge discharge power, based on the detected battery current, the detected battery voltage and the estimated internal resistance, to limit the battery current and the battery voltage respectively within a current use range and a voltage use range.

2. The apparatus of claim 1 further comprising a temperature detector for detecting or estimating a battery temperature, wherein
   the internal resistance estimation unit estimates the internal resistance of the battery based on the detected/estimated battery temperature.

3. The apparatus of claim 1, wherein
   the charge discharge control unit sets the limit value of the charge discharge power that limits the battery current and the battery voltage within the respective use ranges based on a linear approximation of current-voltage characteristics of the battery.

4. The apparatus of claim 1, wherein
   the charge discharge control unit sets the limit value of the charge discharge power, based on a non-linear approximation of current-voltage characteristics of the battery in addition to (a) a difference between the detected battery current and minimum/maximum values of the current use range, and (b) a difference between the detected battery voltage and minimum/maximum value of the voltage use range.

5. The apparatus of claim 1 further comprising a current-voltage characteristic estimation unit for estimating current-voltage characteristics of the battery based on at least two samples of the detected current and voltage, wherein
   the internal resistance estimation unit estimates the internal resistance of the battery based on the current-voltage characteristics estimated by the current-voltage characteristic estimation unit.

6. The apparatus of claim 1, wherein
the charge discharge power control unit sets, as a final limit value of the battery charge discharge power, one of limit values respectively calculated based on the minimum/maximum values of the current use range and the minimum/maximum values of the voltage use range, and
the final limit value is selected as a smallest absolute value among the calculated limit values based on comparison.

7. A battery charge discharge control apparatus for controlling a battery charge discharge power of a battery in a vehicle comprising:
a current detector for detecting a battery current;
a voltage detector for detecting a battery voltage; and
a charge discharge power control unit for setting a limit value of the battery charge discharge power of the battery, based on a current difference between the detected battery current and minimum maximum values of a current use range and a voltage difference between the detected battery voltage and minimum/maximum values of a voltage use range, to limit the battery current and the battery voltage respectively within the current use range and the voltage use range;
wherein the charge discharge power control unit selects, from among the limit values of the battery charge discharge power respectively calculated based on comparison of the current difference and the voltage difference, the limit value having a smallest absolute value as a final limit value.

8. A method of charging and discharging a battery by limiting a battery current and a battery voltage for controlling a battery charge discharge power, the method comprising:
detecting the battery current while charging and discharging the battery;
detecting the battery voltage while charging and discharging the battery;
estimating an internal resistance of the battery; and
setting a limit value of the battery charge discharge power, based on the detected battery current, the detected battery voltage and the estimated internal resistance, to limit the battery current and the battery voltage respectively within a current use range and a voltage use range.

9. The method of claim 8, wherein
the internal resistance of the battery is estimated according to a battery temperature detected by a temperature sensor in the battery.

10. The method of claim 8, wherein
the limit value of the charge discharge power is set, based on a linear approximation of current-voltage characteristics of the battery.

11. The method of claim 8, wherein
the limit value of the charge discharge power is set, based on a non-linear approximation of current-voltage characteristics of the battery in addition to (a) a difference between the detected battery current and minimum/maximum values of the current use range, and (b) a difference between the detected battery voltage and minimum/maximum value of the voltage use range.

12. The method of claim 8, wherein
a current-voltage characteristic of the battery is estimated by sampling the battery current and the battery voltage at least two points, and
the estimation of the internal resistance of the battery is performed based on the estimated current-voltage characteristic of the battery.

13. The method of claim 8, wherein
one of the limit values respectively calculated based on the minimum/maximum values of the current use range and the minimum/maximum values of the voltage use range is set as a final limit value of the battery charge discharge power, and
the final limit value has a smallest absolute value among the calculated limit values.

14. A method of charging and discharging a battery by limiting a battery current and a battery voltage for controlling a battery charge discharge power, the method comprising:
detecting the hatter while charging and discharging the battery;
detecting the battery voltage while charging and discharging the battery;
setting a limit value of the batter charge discharge power of the battery, based on a current difference between the detected battery current and minimum/maximum values of a current use range and a voltage difference between the detected battery voltage and minimum/maximum values of a voltage use range, to limit the battery current and the battery voltage respectively within the current use range and the voltage use range; and
selecting a limit value from among multiple candidate limit values based on the comparison of absolute values of the multiple candidate limit values; and
setting the smallest absolute value as a final limit value.

* * * * *